No. 622,992. Patented Apr. 11, 1899.
B. B. CASH & J. E. STEPHENS.
ANT TRAP.
(Application filed Aug. 27, 1898.)
(No Model.)
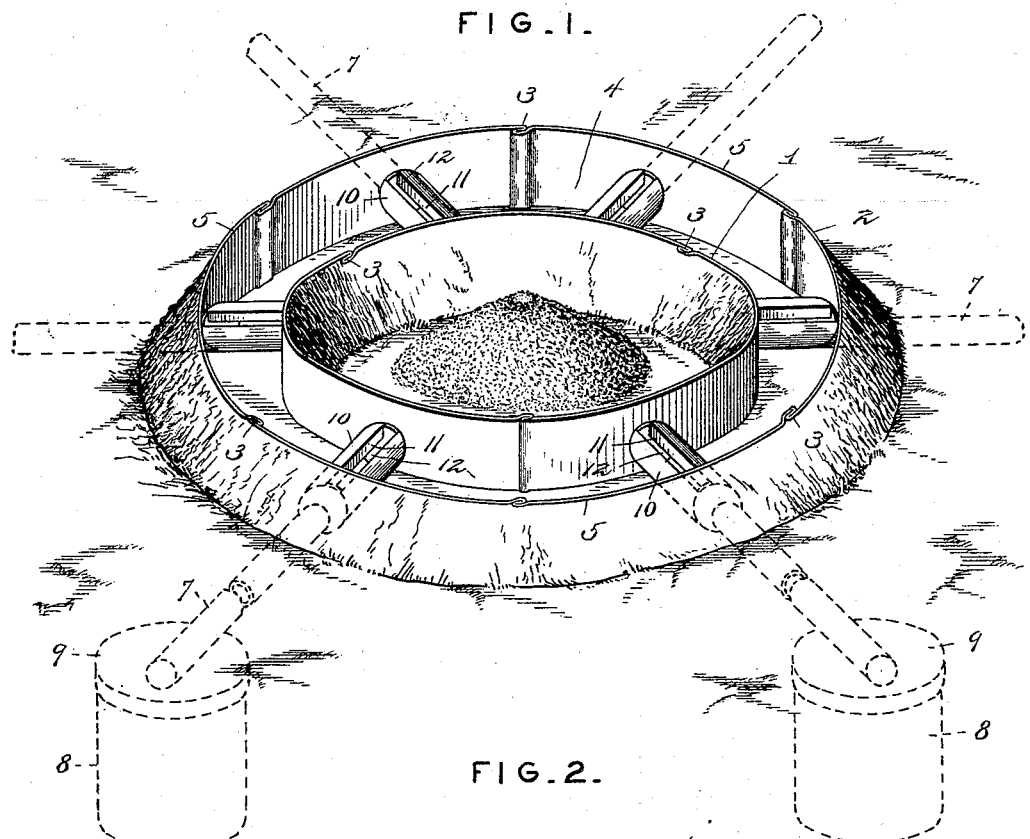
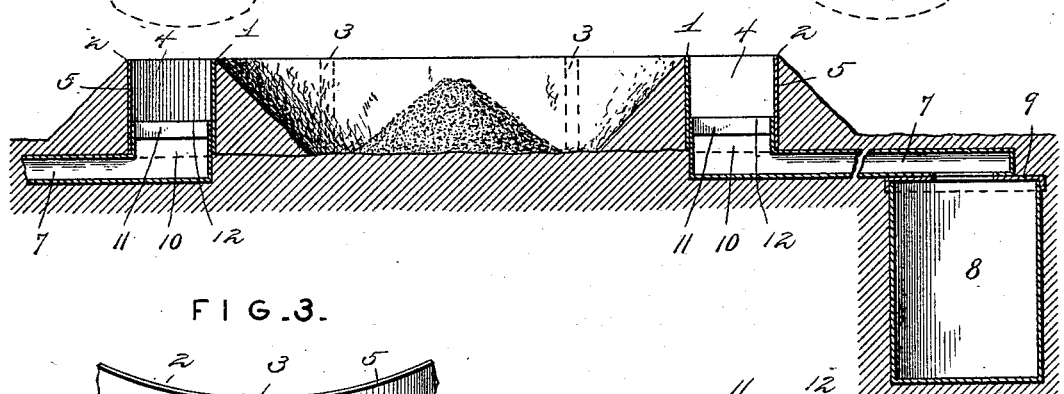
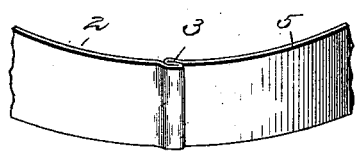
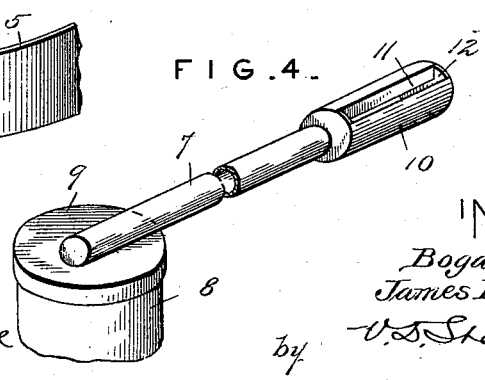
ATTEST-
Harry L. Ames.
Wm. M. Stockbridge.
INVENTORS.
Bogan B. Cash and
James E. Stephens.
by V. D. Stockbridge
their atty.

UNITED STATES PATENT OFFICE.

BOGAN B. CASH AND JAMES EMRY STEPHENS, OF WAYLAND, TEXAS.

ANT-TRAP.

SPECIFICATION forming part of Letters Patent No. 622,992, dated April 11, 1899.

Application filed August 27, 1898. Serial No. 689,662. (No model.)

*To all whom it may concern:*

Be it known that we, BOGAN B. CASH and JAMES EMRY STEPHENS, citizens of the United States, residing at Wayland, in the county of Stephens and State of Texas, have invented certain new and useful Improvements in Ant-Traps; and we do hereby declare the following to be a full, clear, and exact description of the invention, such as will enable others skilled in the art to which it appertains to make and use the same.

Our invention relates to ant-traps, the object of the same being to provide a trap of this kind in which the size thereof may be regulated at will to accommodate the same for use in connection with ants having a single bed of small dimensions or with ants having a plurality of beds covering a comparatively large area.

A further object of the invention is to provide means whereby the parts of the trap interlock one with the other for the purpose of preventing the accidental removal, separation, or disconnection thereof.

Other objects and advantages of the invention will hereinafter appear.

The invention consists of a trap comprising two concentric rings, each made up of separable sections and a conduit leading from the space between said rings and communicating with the receptacle in which the ants are caged.

The invention also consists in certain details of construction and combinations of parts, which will be hereinafter more fully described and claimed.

In the drawings forming part of this specification, Figure 1 represents a perspective view of a trap constructed according to our invention, showing the same in operative position in connection with an ant-bed. Fig. 2 is a vertical longitudinal section through the same, the same extending through one of the conduits leading from the trap and the receptacle with which said conduit communicates. Fig. 3 is a detail perspective view of the outer ring of which the trap is composed, partly broken away to show the means of connection between the sections thereof. Fig. 4 is a detail perspective view of the pipe which constitutes the conduit leading from the trap to the cage or receptacle.

Like reference-numerals indicate like parts in the different views.

In carrying out our invention we employ two concentric rings 1 and 2, both rings being made up of a plurality of sections having cooperating flanges 3 3 upon their opposite ends, by means of which said sections may be readily connected or disconnected for the purpose of increasing or decreasing the size of said rings. The inner ring 1 is placed in the ground around the ant-bed and the outer ring 2, concentric therewith, is located outside of the ring 1 and the bed which the latter incloses, forming an annular space 4, as clearly shown. The earth is banked up upon the inside of the ring 1 and upon the outside of the ring 2, forming inclined ways upon which the ants may travel to enter the annular space 4, the tubes 7 constituting the conduits leading from the space 4 to the cage or receptacle 8 in which the ants are to be led. Both the receptacle 8 and the tube 7 are located beneath the ground, and the outer end of said tube is preferably secured to the lid or cover 9 of said receptacle. The inner end of the tube 7 is formed with an enlargement 10, which is slotted longitudinally and laterally, as shown, forming wings which are bent downwardly, forming flanges 11 11. The outer ends of the enlargement 10 engage, respectively, the outer surface of the inner ring 1 and the inner surface of the outer ring 2, thereby centering the said rings with respect to each other and locking said rings and said tube together. The upper surface of the enlargement 10 lies on a level with the surface of the ground within the annular space 4, so as to permit the ants within said space to pass down within the passage 12 between the flanges 11, and thence into the pipe or conduit 7 and the cage or receptacle 8. The said flanges 11 tend to prevent the egress of the ants from the tube to the space 4 after they have once entered said tube.

Our improved trap is designed to operate as follows: Being placed around the ant-bed in the manner described, the passage of the ants from the ant-hole outwardly will be up over the inner ring 1 and thence down into the annular space or receptacle 4. Reaching said receptacle they pass along the same until they get to one of the passages 12 between the flanges 11, and through said passages they are conducted into the tube or conduit 7 and thence into the cage or receptacle 8. The ants which are outside the bed when the trap is set will pass up over the outer ring 2 and into the annular space 4, following the course heretofore traced.

The advantage in forming the trap without a bottom is that should the ants attempt to dig out beneath the ring 1 or to dig in beneath the ring 2 they would naturally emerge from the ground at a point within the space 4, where it is designed to trap them.

The advantage in having the rings 1 and 2 made up of sections is that a trap of any size may be readily made to suit the conditions under which it is set. For ants having a single bed the rings may be made of comparatively small size; but in the case of army-ants, whose beds cover a large area, it is important that all of them be inclosed within the space occupied by said ring. It is therefore necessary that said rings be of larger diameter. This increase in size can be readily attained by the construction and means heretofore set forth. By the provision of the enlargement 10, whose ends constitute stops which abut against the opposed surface of the rings 1 and 2, the said rings are kept centered at all times, and the parts of the trap are locked together and prevented from accidental displacement.

Having now described our invention, what we claim as new, and desire to secure by Letters Patent, is—

1. In an ant-trap, two concentric rings, means for increasing or decreasing the size of said rings, and a conduit leading from the space between them to a suitable cage or receptacle.

2. In an ant-trap, two concentric rings made up of sections adapted to be connected one to the other whereby the size of said rings may be regulated, and a conduit leading from the space between said rings to a suitable cage or receptacle.

3. In an ant-trap, two concentric rings, a pipe or conduit leading from the space between said rings to a suitable cage or receptacle and an enlargement in said pipe abutting at its inner end against the inner of said rings and at its outer end against the outer of said rings.

4. In an ant-trap, two concentric rings, pipes or conduits leading from the space between said rings to a suitable cage or receptacle, and stops upon the inner ends of said tubes which abut against the opposing surfaces of said rings.

5. In an ant-trap, two concentric rings, pipes or conduits leading from the space between said rings to a suitable cage or receptacle, enlargements on the inner ends of said pipes having longitudinal slits therein and inturned flanges adjacent to said slits, the ends of said enlargements abutting respectively against the opposing surfaces of said rings, as and for the purpose set forth.

In testimony whereof we affix our signatures in presence of two witnesses.

BOGAN B. CASH.
JAMES EMRY STEPHENS.

Witnesses:
A. J. HARDEN,
T. E. HARDEN.